(12) United States Patent
Hramova et al.

(10) Patent No.: US 12,493,639 B1
(45) Date of Patent: Dec. 9, 2025

(54) ENHANCED SEARCH AND RETRIEVAL SYSTEM WITH DISPLAY CONNECTORS

(71) Applicant: MASTERCARD INTERNATIONAL INCORPORATED, Purchase, NY (US)

(72) Inventors: Alexandrina Hramova, Moscow (RU); Aleksey Sidorov, Moscow (RU)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/973,486

(22) Filed: Dec. 9, 2024

(51) Int. Cl.
  *G06F 16/00* (2019.01)
  *G06F 9/451* (2018.01)
  *G06F 16/3331* (2025.01)

(52) U.S. Cl.
  CPC .......... *G06F 16/3331* (2019.01); *G06F 9/451* (2018.02)

(58) Field of Classification Search
  CPC .................................................. G06F 16/3331
  See application file for complete search history.

(56) References Cited

U.S. PATENT DOCUMENTS

2022/0164336 A1* 5/2022 Desai ................... G06F 16/214

* cited by examiner

*Primary Examiner* — Ajith Jacob
(74) *Attorney, Agent, or Firm* — Pillsbury Winthrop Shaw Pittman LLP (57) ABSTRACT

A system may receive a request to access an offline message datastore, the request originating from a requesting device in communication with the message investigator system. The system may, responsive to the request, generate a second interface of the connector system, the second interface comprising a one or more user interface inputs specific to the offline message datastore. The system may receive, via the one or more user interface inputs, one or more search parameters. The system may identify a specific type of data element to search based on the one or more search parameters. The system may identify element-dependent code based on the specific type of data element. The system may execute the identified element-dependent code based on the one or more search parameters to retrieve data that satisfies the search parameter. The system may transmit the retrieved data to the requesting device.

20 Claims, 8 Drawing Sheets

ENHANCED SEARCH AND RETRIEVAL SYSTEM WITH DISPLAY CONNECTORS

BACKGROUND

Search and retrieval systems typically have a backend storage layer for storing data, a query layer for retrieving the data, and an interface layer for receiving query input and providing query results. However, problems can arise when the query and/or interface layers do not have access to data in the storage layer. This problem can occur for various reasons, such as lack of data connections to the storage layer, legacy data systems that are hard-coded for accessing the interface layer, or new or otherwise updated data that is newly available. Another problem that can arise is that the interface layer is unable to integrate the new data in meaningful ways that allows seamless consumption of the previously unavailable data along with the already available data.

BRIEF DESCRIPTION OF THE DRAWINGS

Features of the present disclosure may be illustrated by way of example and not limited in the following figure(s), in which like numerals indicate like elements.

DETAILED DESCRIPTION

The disclosure relates to systems and methods of a connector system for enhanced search and retrieval of offline data. A search and retrieval system may provide or otherwise be coupled to an interface layer that receives query inputs and provides search result outputs. In some instances, the search and retrieval system may be unable to search for and access offline data. Offline data is data that was previously unavailable for retrieval via an interface layer without use of a connector system. The connector system may facilitate retrieval of the offline data through injection code and element-dependent code. The injection code may include a callback or other instruction that directs an interface layer to an injection-based interface. The injection code may be included within the online interface layer, which permits seamless integration with existing search and retrieval interfaces that may link to the code injection-based interface.

The code injection-based interface may include one or more input elements that specify of type of offline data to be accessed. The type of offline data may be associated with element-dependent code of the connector system. The element-dependent code may be executed to specifically retrieve the type of offline data specified by the one or more input elements of the code injection-based interface. For example, the element-dependent code may access offline data based on computational logic that specifically searches for and retrieves the offline data based on the type of data element being requested. The connector system may then make the accessed offline data available through the online interface layer. In this manner, the connector system enables seamless search and retrieval capabilities to offline data that is otherwise not searchable through the interface layer. Having described examples of system operation, a system environment for searching and retrieving offline data will now be described.

Figure 1:
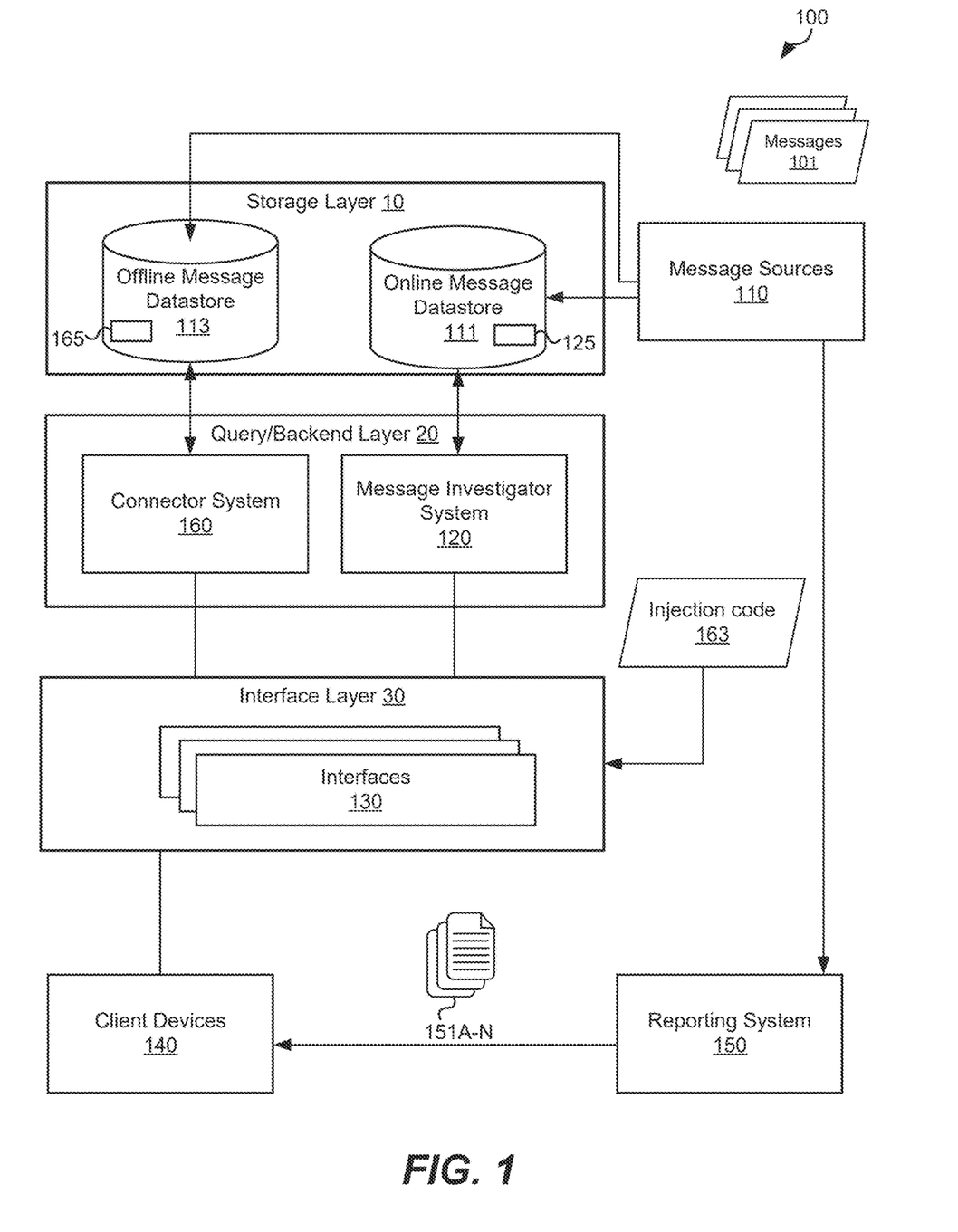
FIG. 1 illustrates an example of a system environment for enhanced search and retrieval with display connectors and element-dependent code to search for and retrieve offline data, according to an implementation.

FIG. 1 illustrates an example of a system environment 100 for enhanced search and retrieval system with display connectors and element-dependent code to connect to otherwise unavailable data. The system environment 100 may include one or more message sources 110, a storage layer 10, a query layer 20, an interface layer 30, one or more client devices 140, a reporting system 150, and/or other features. The storage layer 10 may include an online message datastore 111 and an offline message datastore 113. The query layer 20 may include a message investigator system 120, and a connector system 160. The interface layer 30 may include one or more interfaces 130. At least some of the components of the system environment 100 may be connected to one another via a communication network, which may include the Internet, an intranet, a Personal Area Network, a LAN (Local Area Network), a WAN (Wide Area Network), a SAN (Storage Area Network), a MAN (Metropolitan Area Network), a wireless network, a cellular communications network, a Public Switched Telephone Network, and/or other network through which system environment 100 components may communicate.

A message source 110 is a computer system that provides messages 101. A message 101 is electronic data that conveys information transmitted over a network. A message 101 may include one or more fields of data arranged in a data format suitable for transmission over the network. The particular fields and types of data in a message 101 will vary depending on the implementation of the system environment 100.

In some examples, a message 101 is accessed at the online message datastore 111, the offline message datastore 113, and/or the reporting system 150. In some of these examples, at least one data field and its value may be stored at the offline message datastore 113 but not at the online message datastore 111. In some examples, the reporting system 150 may access at least a portion of a message 101. In these examples, the reporting system 150 may generate a report 151 based on the accessed portion (or all) of the message 101. The reporting system 150 may provide the report 151 to the client device 140, such as by transmitting the report 151 to the client device 140, making the report 151 available for download by the client device 140, streaming the report 151 to the client device 140, or otherwise making the report 151 available to the client device 140.

In some examples, a message 101 may be accessed by the offline message datastore 113 but not the online message datastore 111. In some examples, when a message 101 or parts thereof is not accessible to the message investigator system 120, this message 101 or parts thereof is referred to herein as "offline data."

The message investigator system 120 is a computer system that enables access to data from messages 101, such as from the online message datastore 111. For example, the message investigator system 120 may provide search and retrieval functionality via one or more interfaces 130. The message investigator system 120 may be unable to search for and retrieve data from the offline message datastore 113. An offline message datastore 113 is one in which offline data stored therein is unavailable to the message investigator system 120 without the connector system 160.

The one or more client devices 140 are devices that may access one or more of the interfaces 130 for conducting search and retrieval options via the message investigator system 120. An interface 130 is a user interface that receives inputs for searching and retrieving data from the message investigator system 120. The interface 130 may be a web interface that is displayed via a browser application on the client device 140, a client application that is executed by the client device 140, a remote application that is accessed by the client device 140 via a network, and/or other type of user interface that is accessible by the client device 140. In some examples, the user interface is a command-line interface for which users or applications can perform search and retrieval via a command line. The particular type of interface 130 that is used will vary depending on how the message investigator system 120 implements search and retrieval capabilities.

When the message investigator system 120 is implemented as a b2b search and retrieval platform, the client device 140 is operated by a business entity that searches and retrieves the messages.

The reporting system 150 is a computer system that obtains messages from the message sources 110 and generates one or more reports 151. The reports 151 may convey high level information from the messages. The reports 151 may be provided to relevant entities, such as via the client devices 140. A report 151 is a set of data records derived from one or more messages 101. To access further details about content in a report 151 contents, the client devices 140 may access the message investigator system 120 via one or more interfaces 130 to obtain details The connector system 160 connects the message investigator system 120 with offline data 165, making the offline data searchable and retrievable via the interface layer 30. Offline data 165 is data that is not otherwise available for search and retrieval by the message investigator system 120 because the message investigator system 120 does not have data connections to the offline data 165, which may be stored in the offline message datastore 113.

To facilitate access to the offline data, the interface layer 30 may be provided with injection code 163 that is associated with one or more user interface inputs configured to collect inputs for retrieving information from offline data 165. The injection code 163 may be used to include interface elements into one or more interfaces 130 so that these displays are able to appropriately communicate with the connector system 160. The injection code 163 may cause interface elements to be generated via the one or more interfaces 130. The interface element from the injection code 163, when selected, may cause an injection-based interface 230 to be generated. The injection-based interface 230 may be associated with the connector system 160. For example, the injection-based interface 230 may include forms that are submitted to the connector system 160 for retrieving the offline data 165.

Figure 2:
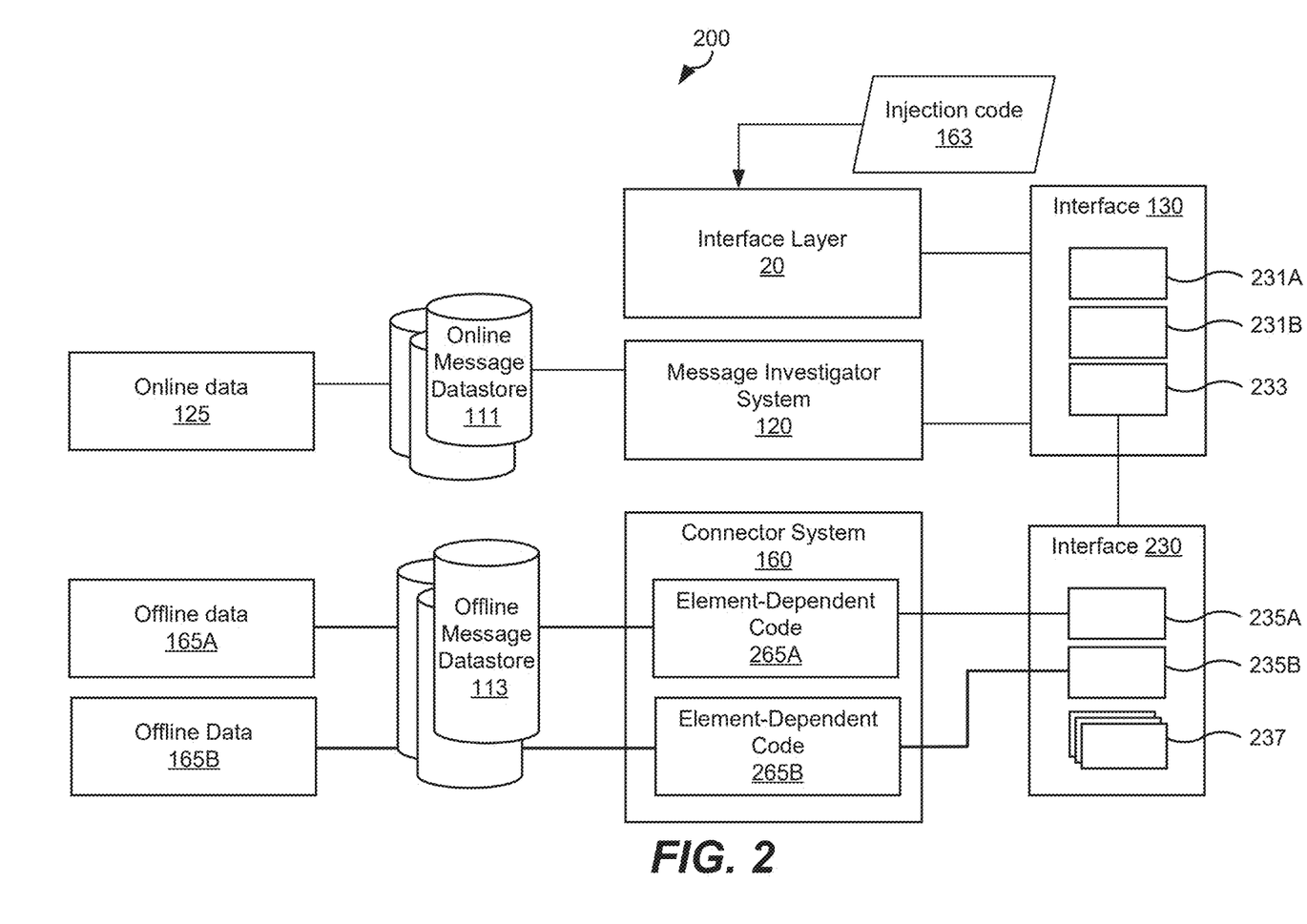
FIG. 2 illustrates a flow diagram of examples of operations of the system environment illustrated in FIG. 1, according to an implementation.

FIG. 2 illustrates a flow diagram 200 of examples of operations of the system environment illustrated in FIG. 1. FIG. 2 will be described with reference to examples of interfaces or interface elements described in FIGS. 3, 4A and 4B for illustration.

The message investigator system 120 may provide or otherwise be coupled to an interface 130 that enables users to search for and retrieve data. As illustrated, the interface 130 includes a UI input 231A, a UI input 231B, and an injected UI input 233. The UI inputs 231A and 231B may each be configured to receive one or more query parameter inputs used to query and retrieve online data 125 from the online message datastore 111.

Figure 3:
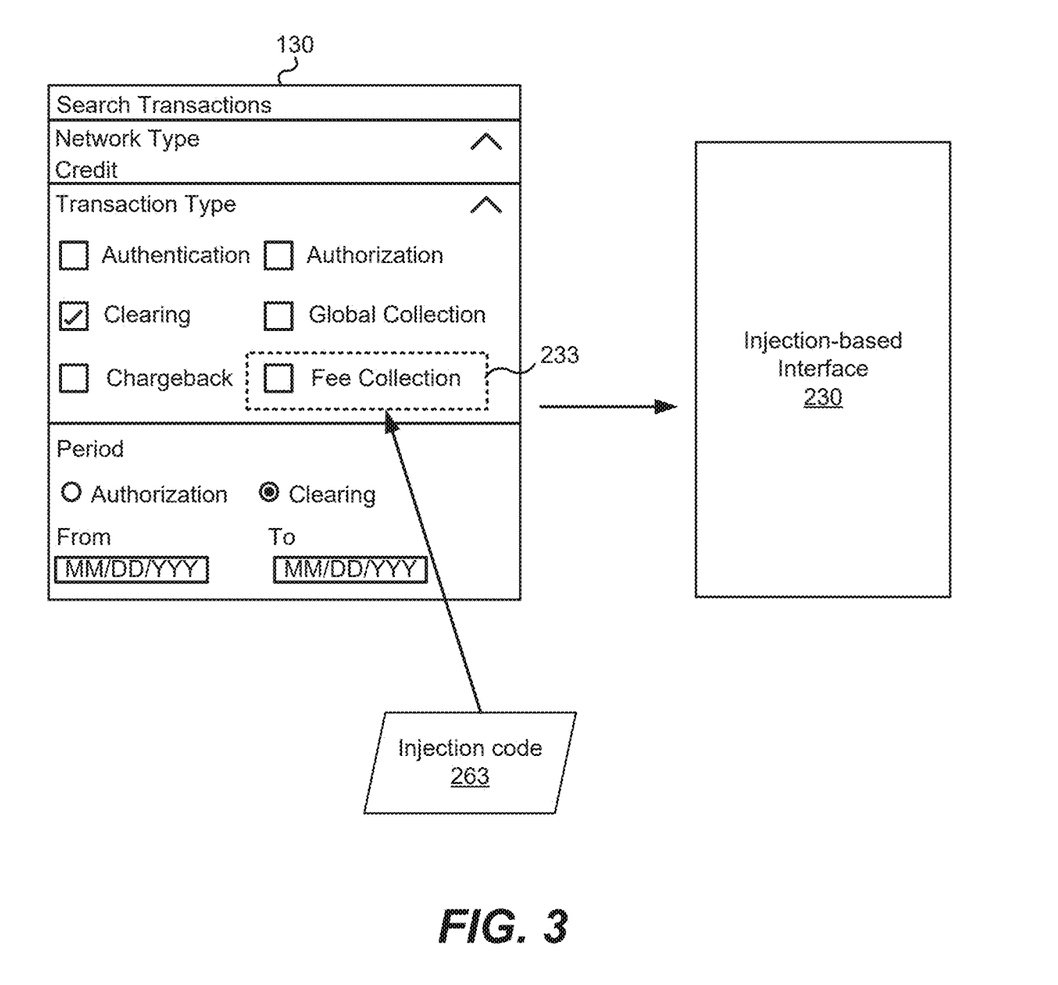
FIG. 3 illustrates an example of an interface that includes an injected UI input, according to an implementation.

To facilitate access to the offline data 165, the interface 130 may include an injected UI input 233. An injected UI input 233 is a UI input configured to receive input data based on injection code 163. Injection code 163 is computer readable instruction such as software or markup language that causes the injected UI input 233 to be generated on an interface, such as interface 130. For example, the injection code 163 may include client-side instructions that are sent to and rendered or executed by a client device 140. Non-limiting examples of client-side instructions include HyperText Markup Language (HTML) and JAVASCRIPT. In some examples, the injection code 163 may include server-side instructions that are executed by a computer, such as a webserver of the interface layer, that produces an output that is suitable for transmission to the client device 140. The output may include client-side instructions such as HTML and/or JAVASCRIPT. Examples of server-side instructions include Python and RUBY. An example of an injected UI input 233 is illustrated in FIG. 3, which illustrates an example of an interface 130 that includes an injected UI input 233, according to an implementation. The interface 130 in this example may include injection code 163 that causes the injected UI input 233 to be generated.

Figure 4A:
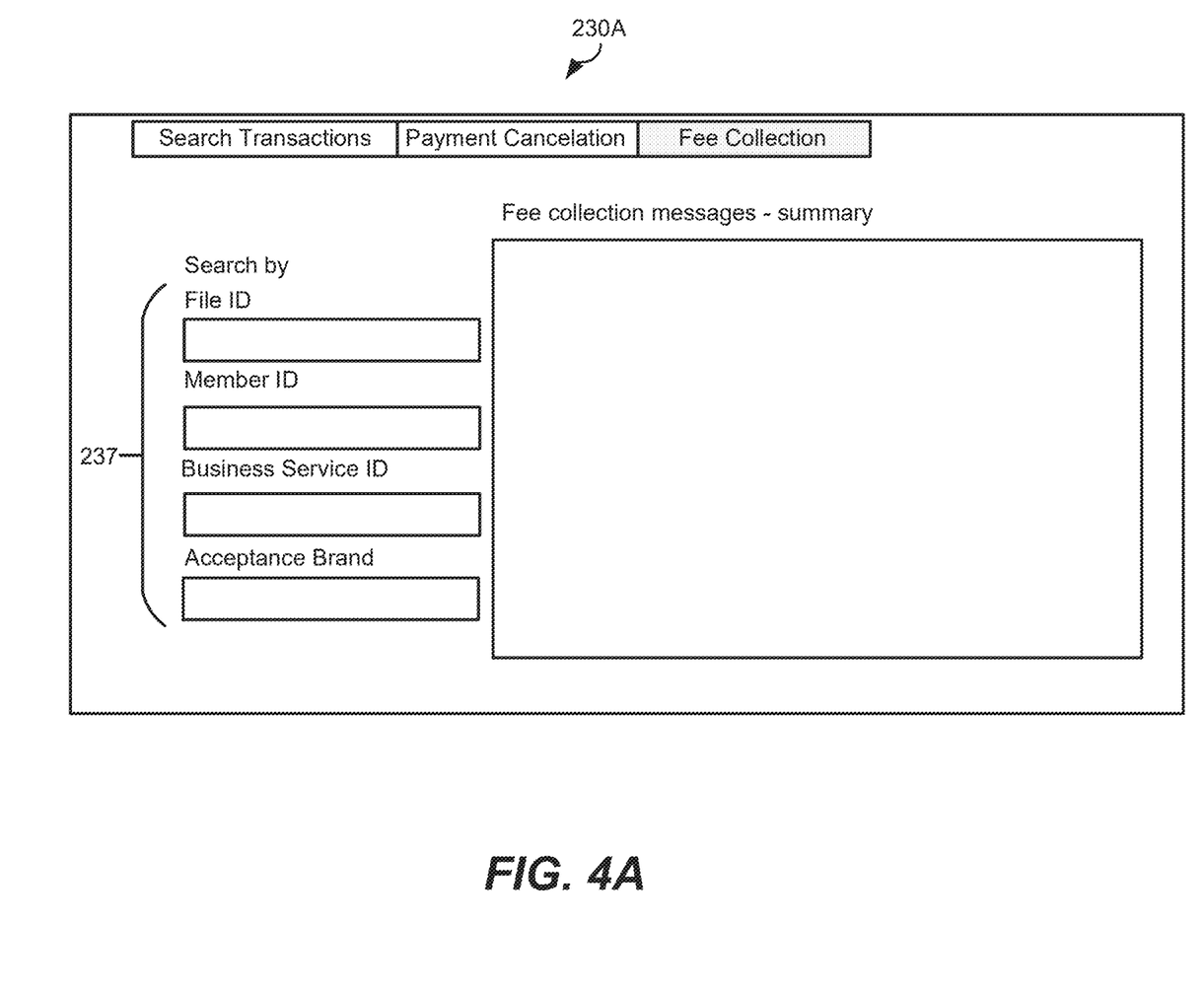
FIG. 4A illustrates an example of an injection-based interface for search and retrieval operations on an offline message datastore in which data element types to search are automatically identified, according to an implementation.

The UI input 233 may have a callback to the interface layer 20 such that, when selected, causes injection-based interface 230 to be generated. The injection-based interface 230 may be associated with the connector system 160. The injection-based interface 230 may be associated with automatically identifying element-dependent code 265 to search as illustrated in FIGS. 4A and 5A. In another example, the injection-based interface 230 may be associated with identifying element-dependent code 265 based on data element type inputs 235 as illustrated in FIGS. 4B and 5B.

Referring to FIG. 4A, the injection-based interface 230A may include one or more query parameter inputs 237 configured to receive inputs and provide the received inputs to the connector system 160 (or webservices associated with the connector system 160 via the interface layer 20). In some examples, a query parameter input 237 may include a record identifier input that is configured to receive a record identifier. In these examples, the connector system 160 may receive the record identifier via the record identifier input and automatically identify element-dependent code 265A or 265B (or other element-dependent code) to execute to retrieve the offline data 165A or 165B. For example, the record identifier may be a string in which a portion of the string is used to identify the element-dependent code 265A or 265B to use to retrieve the offline data.

Figure 4B:
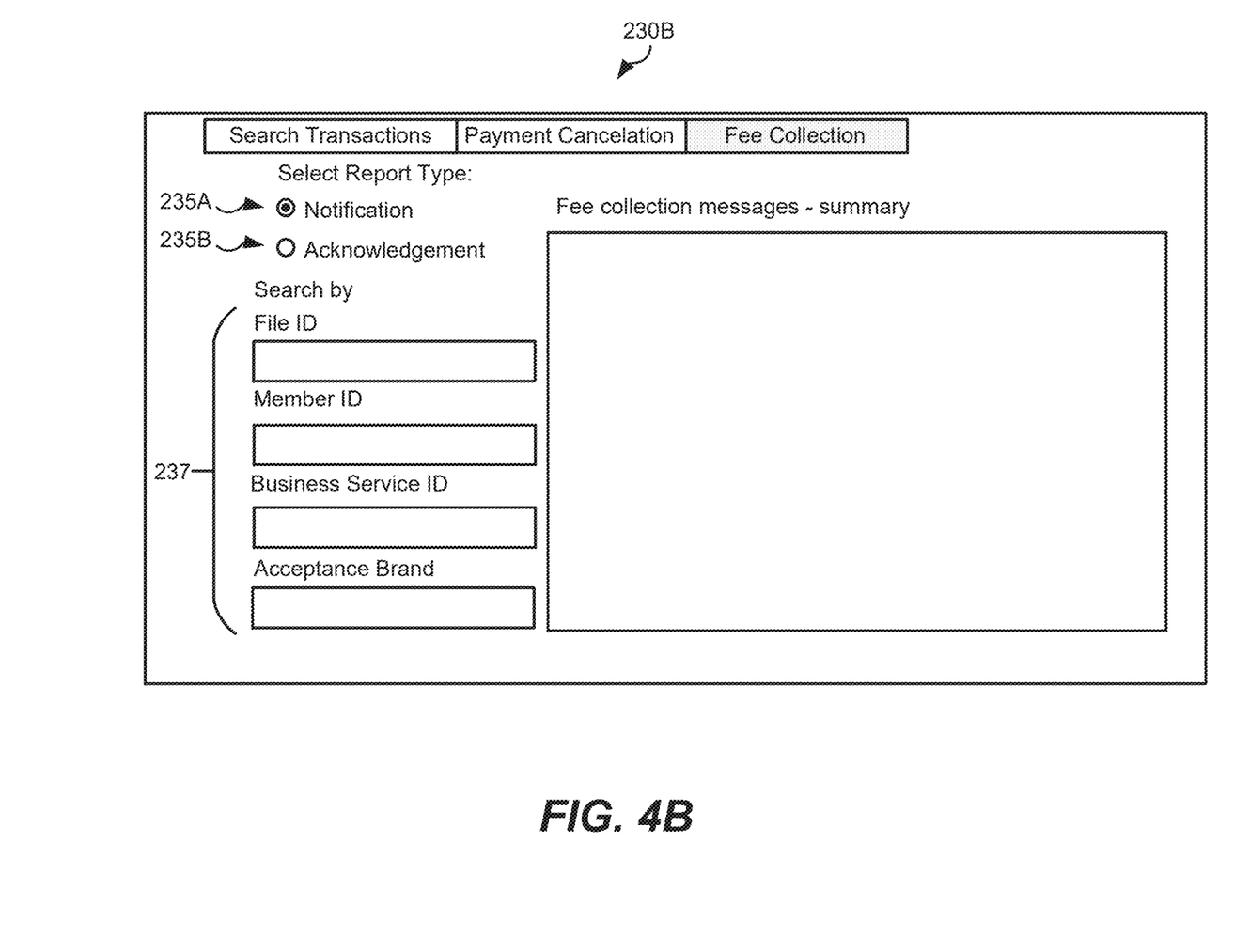
FIG. 4B illustrates another example of an injection-based interface for search and retrieval operations on an offline message datastore in which data element types to search are derived from data element type inputs, according to an implementation.
Figure 5A:
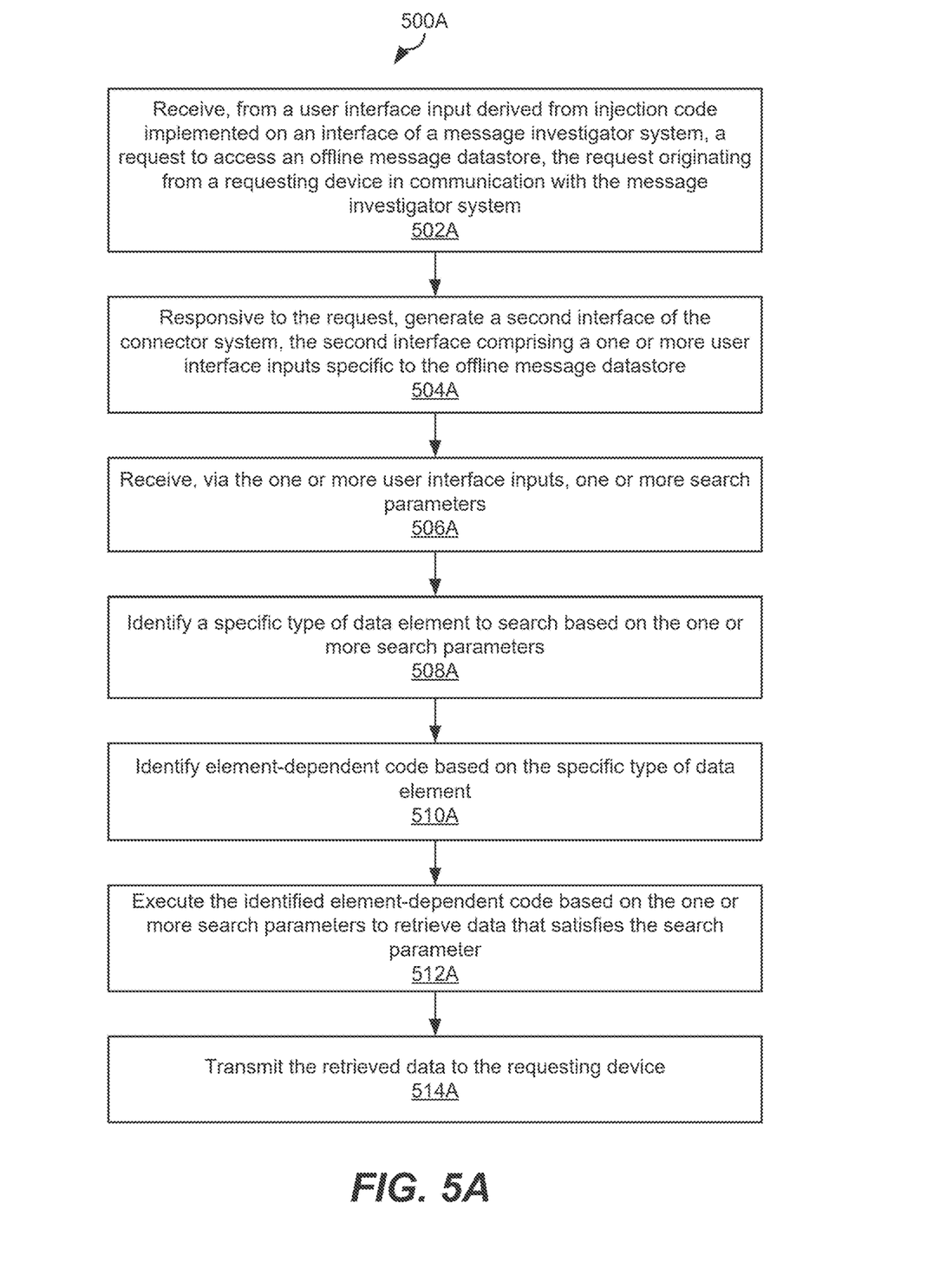
FIG. 5A illustrates an example of a method of accessing offline data via a connector system in which data element types to search are automatically identified, according to an implementation.
Figure 5B:
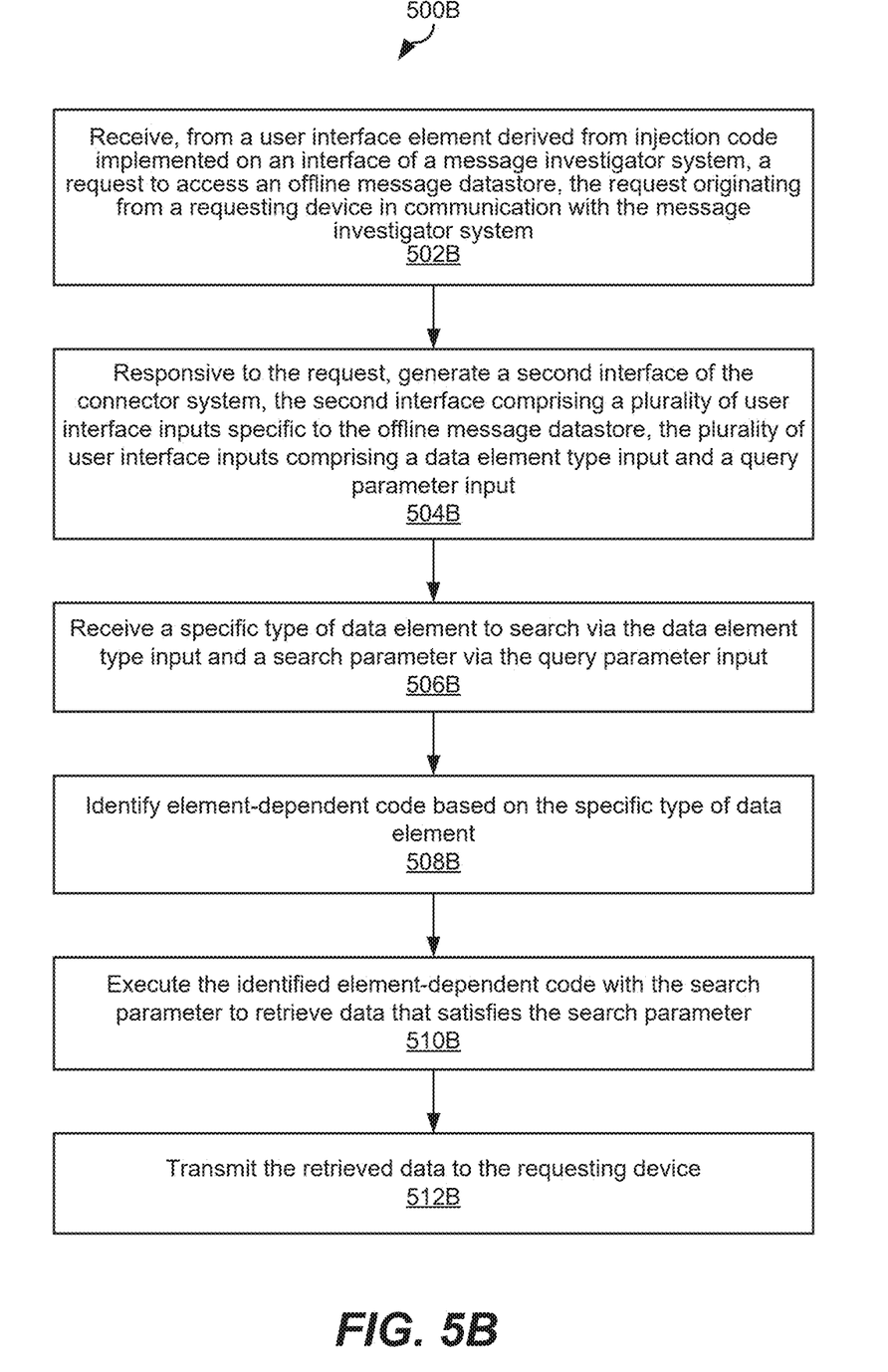
FIG. 5B illustrates an example of a method of accessing offline data via a connector system in which data element types to search are derived from data element type inputs, according to an implementation.

In another example, referring to FIG. 4B, the injection-based interface 230B may include data element type inputs 235 (illustrated as data element type inputs 235A and 235B)

and one or more query parameter inputs 237 that are each configured to receive inputs and provide the received inputs to the connector system 160 (or webservices associated with the connector system 160 via the interface layer 20).

In some examples, the data element type inputs 235A and 235B may be mutually exclusive input options, meaning that selection of one or the other, but not both, is permitted. An example of this type of input is a radio input in HTML, as illustrated in FIG. 4B. If there are other data element type inputs 235 (not shown), all of these inputs may be mutually exclusive input options with respect to each other as well.

A data element type input 235 may be associated with corresponding offline data 165 to retrieve. For example, data element type inputs 235A and 235B are respectively associated with offline data 165A and 165B. In particular, selection of data element type input 235A provides an indication that the offline data 165A is to be retrieved and selection of data element type input 235B provides an indication that the offline data 165B is to be retrieved. Other types of offline data 165 may be similarly associated with a corresponding data element type input 235.

In some examples, offline data 165 may be accessed by respective element-dependent code 265 for search and retrieval responsive to selection of the corresponding data element type input 235. Element-dependent code 265 is a computer executable instruction that is specifically configured to access corresponding offline data 165. For example, a selection of data element type input 235A and input via one or more query parameter inputs 237 may be transmitted via the interface layer 20 to the connector system 160. Responsive to these inputs, the connector system 160 may identify element-dependent code 265A that corresponds to the data element type input 235A and specifically access the offline data 165A for search and retrieval by executing the element-dependent code 265A with the one or more query parameter inputs 237. Likewise, a selection of data element type input 235A and input via one or more query parameter inputs 237 may be transmitted via the interface layer 20 to the connector system 160. Responsive to these inputs, the connector system 160 may identify element-dependent code 265A that corresponds to the data element type input 235B and specifically access the offline data 165B for search and retrieval by executing the element-dependent code 265B with the inputs from the one or more query parameter inputs 237.

In some examples, the type of element-dependent code 265 may vary depending how the offline data 165 is stored. For example, if the offline message datastore 113 is a relational database that stores the offline data 165 in a database table, the element-dependent code 265 may be specifically programmed to access the offline data 165 via specific Structure Query Language (SQL) queries or other relational database request. In this example, each element-dependent code 265 may build and execute element-specific queries. For example, element-dependent code 265A may generate a first Structured Query Language (SQL) query based on the one or more query parameter inputs 237 to retrieve information from offline message datastore 113. Similarly, element-dependent code 265B may generate a second SQL query based on the one or more query parameter inputs 237 to retrieve information from offline message datastore 113. In the foregoing examples, the first SQL query may be configured to retrieve offline data from a first database table and/or column and the second SQL query may be configured to retrieve offline data from a second database table and/or column different from the first database table and/or column.

Other element-dependent code 265 may program a processor to specifically access offline data 165 for search and retrieval in other ways. For example, if the offline message datastore 113 is a filesystem that stores the offline data 165 as a file, the element-dependent code 265 may be specifically programmed to access a particular partition, directory, and/or other portion that stores the offline data 165.

By using element-dependent code 265, the connector system 160 may be scaled to access specific types of offline data 165 from different sources. In particular, whenever additional or other offline data 165 is to be made accessible to the message investigator system 120, element-dependent code 265 may be added for execution by the connector system 160 to access that offline data.

Offline data 165 may be queried for various reasons. In one example, a user may wish to obtain further information in relation to a report 151. In this example, the reporting system 150 may generate the report 151 for a user. The report 151 may be generated on a periodic basis, such as nightly, weekly, monthly, or other regular basis. The nature and content of the report 151 will vary depending on the particular context in which the system environment 100 illustrated in FIG. 1 is implemented. In some examples that follow, an example of a report 151 will be illustrated as either a notification report or an acknowledgement report for payment card transactions.

In one example operation, the reporting system 150 may generate a report 151A and/or report 151B and transmit one or both to a user via the client device 140. The user may wish to obtain details about one or more of the reports 151A and 151B. The user may access the interface 130, which includes UI inputs 231A and 231B to access additional data based on values in the reports 151A or 151B. For example, a report 151A may include an identifier for a specific field of data that is stored as online data 125 of the online message datastore 111. The online data 125 may include a particular data record such as a column in a relational database or a field name in a document. In this example, the message investigator system 120 may query the online message datastore 111 to obtain the online data 125. However, in some instances, the user may wish to obtain additional data to which the message investigator system 120 does not have access, such as offline data 165A and/or offline data 165B stored in the offline message datastore 113.

While the online message datastore 111 and the offline message datastore 113 are illustrated as separate datastores, they may be part of a single datastore system. For example, the online message datastore 111 and the offline message datastore 113 may each represent different relational tables in a relational database or different relational columns in a relational table. For examples in which the datastores are filesystems, the online message datastore 111 and the offline message datastore 113 may be in the same filesystem, same partition, same disk, and so forth. Whichever the implementation, the message investigator system 120 may be able to access the online message datastore 111 but not access the offline message datastore 113 without the use of the connector system 160.

Examples of Implementations of the Connector System to Access Offline Data

The message investigator system 120 may access offline data 165 and online data 125 in various contexts. A particular context will be described for illustrative purposes in which the message investigator system 120 is implemented by a payment card network that processes credit card and other payment transactions.

When a payment is made via a payment card, a point-of-sale (POS) system or online payment gateway captures card information (such as card number, expiration date, and CVV) and transmits the data to an acquiring bank (or other entity). The acquiring bank may transmit a transaction request with the card information to the payment network for authorization. The payment network may identify the issuing bank and route the transaction request to the issuing bank. The issuing bank may review the request and transmits back an authorization response to the payment network. This response may be either approved, declined, or pending further review. If the transaction is approved, the funds may be transferred from the customer's issuing bank to the merchant's acquiring bank. The acquiring bank then deposits the funds into the merchant account (less any processing fees) in connection with settlement.

In some examples, the payment network may generate a clearing report, sometimes referred to as an IP727* report, which is a specific example of a report 151. The clearing report includes acquiring/issuing activity relating to a merchant. The clearing report may include first presentments, chargebacks, fee collections, and/or other data fields. In some examples, the payment network may provide further details on these or other activity via the message investigator system 120. However, at least some of the data, such as data relating to fee collections, may be offline and ordinarily not available through the message investigator system 120. In these examples, the connector system 160 may be used to seamlessly integrate retrieval of this offline data through the message investigator system 120.

For example, a customer (such as the issuer, acquirer, or other entity) may review the clearing report and sees an unrecognized fee collection message, which includes one or more data fields relating to a fee collection. The customer may launch an application or otherwise access user interface 130 to obtain further details about the unrecognized fee collection message. However, because the fee collection message is offline data, the user interface 130 ordinarily does not include UI elements for searching this data. To make this offline data available through the user interface 130 (or seamlessly with the user interface 130), the user interface 130 includes an injected UI input 233 for accessing an injection-based interface that is associated with the offline data (in this case, fee collection message data).

When selected, the injected UI input 233 may cause the injection-based interface 230 to be generated and displayed. The injection-based interface 230B may include data element type inputs 235A and 235B. Data element type input 235A is associated with a "Notification" incoming message for the customer and data element type input 235B is associated with an "Acknowledgement" outgoing message for the customer. Details regarding each of these types of data elements may be stored separately from one another and therefore require different code to retrieve them. For example, the data element type input 235A may cause the element-dependent code 265A to be executed to retrieve "Notification" related data fields and the data element type input 235B may cause the element-dependent code 265B to be executed to retrieve "Acknowledgement" related data fields.

Table 1A illustrates an example of element-dependent code 265A to retrieve information from offline data 165 based on a first type of data element of a report. In this example, a "notification to customer" type of data element from a report is shown. Data elements with (*) are used for a proper data displaying. Data element with (**) may be used for provisioning. (*) and (**) are used as labels and not part of the data element or code from Table 1B.

```
TABLE FILE fee_detail/fee_detail
BY F_D.F_D.FILE_ID_RECIPIENT(*)
BY F_D.F_D.BUSINESS_SERVICE_ID_CD
BY F_D.F_D.ACCEPTANCE_BRAND_ID
BY F_D.F_D.RECON_DT_AS 'Recon Dt'
BY F_D.F_D.RECON_CYCLE_NUM_AS 'Recon Cycle Num'
BY F_D.F_D.CH_TXN_TYPE
BY F_D.F_D.FUNCTION_CD
BY F_D.F_D.MSG_REASON_CD
BY F_D.F_D.MBR_MSG_BLOCK
BY F_D.F_D.RECEIVE_ICA
BY F_D.F_D.SEND_ICA
BY F_D.F_D.RETRIEVAL_REF_NBR
BY F_D.F_D.TXN_AMT_TXN_CUR
BY F_D.F_D.TXN_CUR_CODE
BY F_D.F_D.TXN_AMT_SETL_CUR(*)
BY F_D.F_D.SETL_CUR_CODE(*)
BY F_D.F_D.ACQ_MERCH_ID
BY F_D.F_D.TERMINAL_ID
BY F_D.F_D.REVERSAL_IND
BY F_D.F_D.ARN_IC_RATE_IND
BY F_D.F_D.ARN_ACQ_BIN
BY F_D.F_D.ARN_PROC_DATE
BY F_D.F_D.ARN_SEQ_NO
BY F_D.F_D.ARN_CHK_DIGIT
BY F_D.F_D.FEE_COLL_CONTROL_NBR
WHERE F_D.F_D.FILE_ID_RECIPIENT (*)EQ &FILE_ID_RECIPIENT;
WHERE F_D.F_D.BUSINESS_SERVICE_ID_CD EQ &BUSINESS_SERVICE_ID_CD;
WHERE F_D.F_D.RECEIVE_ICA (**)EQ &RECEIVE_ICA.(|FORMAT=D20.2);
WHERE F_D.F_D.ACCEPTANCE_BRAND_ID EQ &ACCEPTANCE_BRAND_ID;
```

Table 1B illustrates an example of element-dependent code 265B to retrieve information from offline data 165 based on a second type of data element of a report. In this example, an "acknowledgement from customer" type of data element of a report is shown. Data elements with (Q) are used for a proper data displaying. Data elements with () may be used for provisioning. (Q) and () are used as labels and not part of the data element or code from Table 1B.

```
TABLE FILE f_d/f_d
BY F_D.F_D.FILE_ID_SENDER (*) AS 'File Id'
BY F_D.F_D.BUSINESS_SERVICE_ID_CD
BY F_D.F_D.RECON_CYCLE_NUM AS 'Recon Cycle Num'
BY F_D.F_D.CH_TXN_TYPE
BY F_D.F_D.FUNCTION_CD
BY F_D.F_D.MSG_REASON_CD
BY F_D.F_D.MBR_MSG_BLOCK
BY F_D.F_D.RECEIVE_ICA
BY F_D.F_D.SEND_ICA
BY F_D.F_D.RETRIEVAL_REF_NBR
BY F_D.F_D.TXN_AMT_TXN_CUR
BY F_D.F_D.TXN_CUR_CODE
BY F_D.F_D.SEND_SETL_AMT (*)AS 'Send Setl Amt'
BY F_D.F_D.SEND_SETL_CURR (*) AS 'Send Setl Curr Cd'
BY F_D.F_D.REVERSAL_IND
WHERE F_D.F_D.BUSINESS_SERVICE_ID_CD EQ &BUSINESS_SERVICE_ID_CD;
WHERE F_D.F_D.SEND_ICA (**)EQ &SENDER_ICA;
WHERE F_D.F_D.FILE_ID _SENDER (*)EQ &FILE_ID_SENDER.;
WHERE F_D.F_D.ACCEPTANCE_BRAND_ID EQ &ACCEPTANCE_BRAND_ID
```

For provisioning purposes, data may be made available only to authorized users. For example, to restrict access to authorized users, the following instructions can be used:

if Notification is selected, customer ICA should match FEE_DETAIL.RECEIVE_ICA if Acknowledgment is selected, customer ICA should match FEE_DETAIL.SEND_ICA Examples of Integration with Online Search Systems In some examples, offline data 165 accessed by element-dependent code 265 (such as element-dependent code 265A and/or 265B) may be presented by the injection-based interface 230B. In some examples, the accessed offline data 165 may be presented in an integrated way with the interface 130 to enable seamless access to both online data and offline data via the message investigator system 120.

In some examples, access to offline data 165 and online data 125 may be integrated within the message investigator system 120 by using uniform protocols for data access and presentation. In some examples, a seamless experience may be provided to the user via session control by maintaining state between interfaces 130 and 230A or 230B. In this way, a user experience is seamlessly maintained whether data is to be retrieved from the offline message datastore or the online message datastore. For example, state in the context of web applications refers to the data that needs to be preserved throughout a user's session. This can include data such as login credentials, search retrieval inputs or outputs, user preferences, and so forth. Maintaining state between websites is essential for providing a seamless and personalized user experience. State may be maintained based on client-side sessions, server-side sessions, hidden form fields, cookies, and/or other data that enables seamless integration of offline data retrieval and presentation with online data retrieval and presentation.

Client-side sessions more store session data at a client (such as in browser) to maintain the state of a given search session. This session data may include state information, such as user identification information, query inputs, and/or other state information. The session data be maintained during both offline data and online data retrieval, enabling seamless integration of the offline data retrieval via the data connector system and online data retrieval. Session data may be temporary when stored at a browser or persistently stored locally on disk.

Server-side session data may be stored at a server in association with a unique session identifier. In these implementations, the session data may be stored remotely from the browser/client. In some examples, the state data may be stored via hidden form fields in the interface 130 and the interface 230A or 230B.

FIG. 5A illustrates an example of a method 500A of accessing offline data 165 via a connector system 160 in which data element types to search are automatically identified, according to an implementation.

At 502A, the method 500A may include receiving, from a user interface input (such as injected UI input 233) derived from injection code (such as injection code 163) implemented on an interface of a message investigator system (such as message investigator system 120), a request to access an offline message datastore (such as the offline message datastore 113), the request originating from a requesting device in communication with the message investigator system.

At 504A, responsive to the request, the method 500A may include generating a second interface (such as the interface 230) of the connector system, the second interface comprising a one or more user interface inputs (such as query parameter input 237) specific to the offline message datastore.

At 506A, the method 500A may include receiving, via the one or more user interface inputs, one or more search parameters, such as a record identifier and/or other parameters. At 508A, the method 500A may include identifying a specific type of data element to search based on the one or more search parameters. At 510A, the method 500A may include identifying element-dependent code (such as element-dependent code 165A or 165B) based on the specific type of data element.

At 512A, the method 500A may include executing the identified element-dependent code based on the one or more search parameters to retrieve data that satisfies the search parameter. At 514A, the method 500A may include transmitting the retrieved data to the requesting device. FIG. 5B illustrates an example of a method 500B of accessing offline data 165 via a connector system 160 in which data element types to search are derived from data element type inputs, according to an implementation. At 502B, the method 500B may include receiving, from a user interface input (such as injected UI input 233) derived from injection code (such as injection code 163) implemented on an interface of a message investigator system (such as message investigator system 120), a request to access an offline message datastore (such as offline message datastore 113), the request originating from a requesting device in communication with the message investigator system.

At 504B, the method 500B may include, responsive to the request, generating a second interface (such as the interface 230) of the connector system, the second interface comprising a plurality of user interface inputs specific to the offline message datastore, the plurality of user interface inputs comprising a data element type input (such as a data element type input 235) and a query parameter input (such as query parameter input 237). At 506B, the method 500B may include receiving a specific type of data element to search via the data element type input and a search parameter via the query parameter input.

At 508B, the method 500B may include identifying element-dependent code based on the specific type of data element. For example, the specific type of data element may specify an identifier or other information that identifies the element-dependent code. At 510B, the method 500B may include executing the identified element-dependent code with the search parameter to retrieve data that satisfies the search parameter. At 512B, the method 500B may include transmitting the retrieved data to the requesting device.

Figure 6:
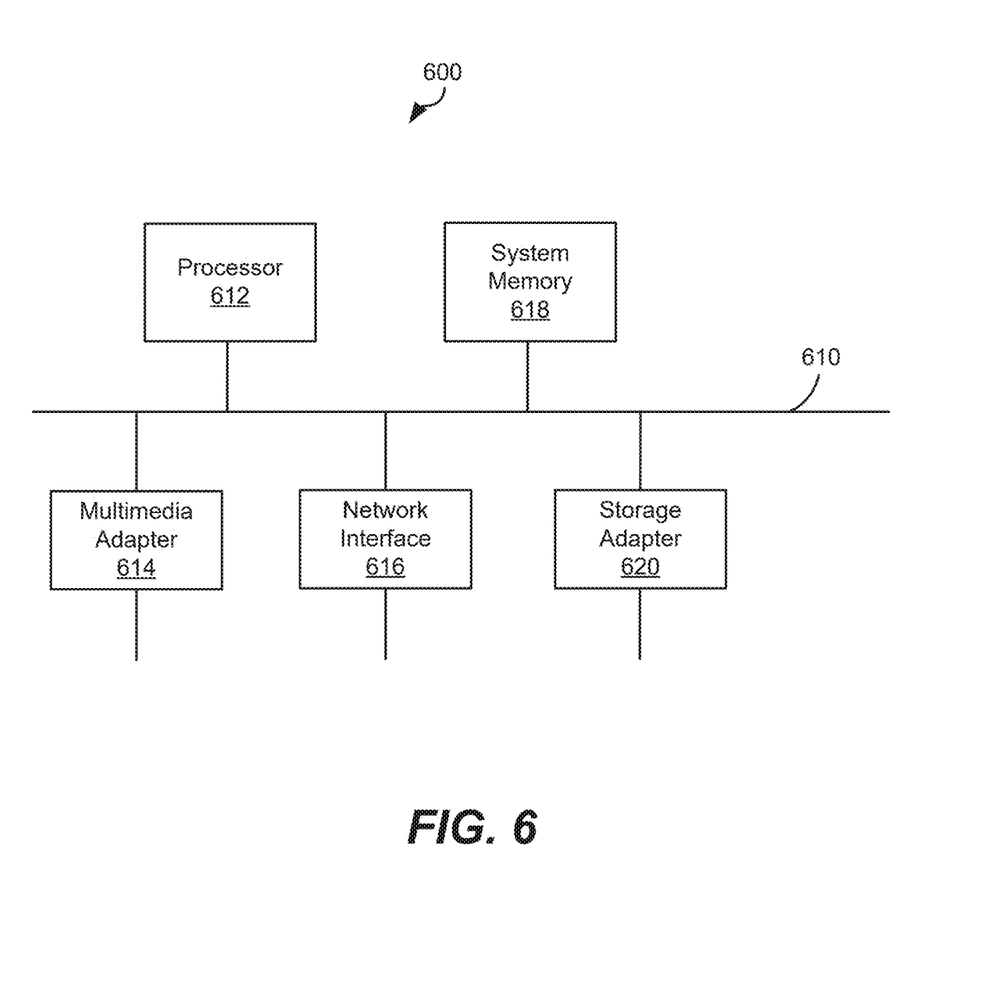
FIG. 6 illustrates an example of a computer system that may be implemented by devices illustrated in FIG. 1.

FIG. 6 illustrates an example of a computer system 600 that may be implemented by devices illustrated in FIG. 1. The computer system 600 may be part of or include the system environment 100 to perform the functions and features described herein. For example, various ones of the devices of system environment 100 may be implemented based on some or all of the computer system 600. The computer system 600 may include, among other things, an interconnect 610, a processor 612, a multimedia adapter 614, a network interface 616, a system memory 618, and a storage adapter 620.

The interconnect 610 may interconnect various subsystems, elements, and/or components of the computer system 600. As shown, the interconnect 610 may be an abstraction that may represent any one or more separate physical buses, point-to-point connections, or both, connected by appropriate bridges, adapters, or controllers. In some examples, the interconnect 610 may include a system bus, a peripheral component interconnect (PCI) bus or PCI-Express bus, a HyperTransport interconnect, an industry standard architecture (ISA)) bus, a small computer system interface (SCPI) bus, a universal serial bus (USB), IIC (I2C) bus, or an Institute of Electrical and Electronics Engineers (IEEE) standard 1384 bus, or "firewire," or other similar interconnection element.

In some examples, the interconnect 610 may allow data communication between the processor 612 and system memory 618, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 612 may control operations of the computer system 600. In some examples, the processor 612 may do so by executing instructions such as software or firmware stored in system memory 618 or other data via the storage adapter 620. In some examples, the processor 612 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 614 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 616 may provide the computer system 600 with an ability to communicate with a variety of remote devices over a network. The network interface 616 may include, for example, an Ethernet adapter, a Fibre Channel adapter, and/or other wired- or wireless-enabled adapter. The network interface 616 may provide a direct or indirect connection from one network element to another, and facilitate communication to, and between, various network elements. The storage adapter 620 may connect to a standard computer readable medium for storage and/or retrieval of information, such as a fixed disk drive (internal or external).

Other devices, components, elements, or subsystems (not illustrated) may be connected in a similar manner to the interconnect 610 or via a network. The devices and subsystems can be interconnected in different ways from that shown in FIG. 6. Instructions to implement various examples and implementations described herein may be stored in computer-readable storage media such as one or more of system memory 618 or other storage. Instructions to implement the present disclosure may also be received via one or more interfaces and stored in memory. The operating system provided on computer system 600 may be MS-DOS®, MS-WINDOWS®, OS/2®, OS X®, IOS®, ANDROID®, UNIX®, Linux®, or another operating system.

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "101A-N" does not refer to a particular number of instances of 101A-N, but rather "two or more."

The UI inputs (such as 231, 233, 235, 237) may be various types of user interface elements configured to receive input data. Examples of UI inputs may include a text field, a radio button, a check box, a list option, buttons, pickers (such as date or time pickers), menus, tabs, and/or other elements configured to receive an input via a user interface. The interfaces (such as 130, 230) may include graphical user interfaces, command-line interfaces (CLIs), and/or other types of interfaces that can receive input data. In the case of CLIs, the UI inputs may be configured as command-line parameters rather than UI elements.

The databases (such as 111, 113) may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independently and separate from other components and processes described herein. Each component and process may also be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
a connector system comprising a processor programmed to:
receive, from a user interface input derived from injection code implemented on an interface of a message investigator system, a request to access an offline message datastore, the request originating from a requesting device in communication with the message investigator system;
responsive to the request, generate a second interface of the connector system, the second interface comprising a one or more user interface inputs specific to the offline message datastore;
receive, via the one or more user interface inputs, one or more search parameters;
identify a specific type of data element to search based on the one or more search parameters;
identify element-dependent code based on the specific type of data element;
execute the identified element-dependent code based on the one or more search parameters to retrieve data that satisfies the search parameter; and
transmit the retrieved data to the requesting device.

2. The system of claim 1, wherein the one or more search parameters comprise a record identifier having a string and wherein at least a portion of the string encodes the specific type of data element to search.

3. The system of claim 1, wherein the one or more user interface inputs comprise a at least a first data element type input and a second data element type input that are mutually exclusive to one another, wherein the specific type of data element is identified based on the first data element type input or the second data element type input.

4. The system of claim 3, wherein the first data element type input, when selected, causes first element-dependent code to be executed.

5. The system of claim 4, wherein the second data element type input, when selected, causes second element-dependent code, different than the first element-dependent code, to be executed.

6. The system of claim 1, wherein the interface is associated with retrieval operations for an online message datastore and the second interface is associated with retrieval operations for the offline message datastore.

7. The system of claim 5, wherein a state is maintained between the interface and the second interface.

8. The system of claim 1, further comprising:
a reporting system configured to:
generate a report comprising a reference to data in an online message datastore and a second reference to data in the offline message datastore; and
transmit the report to the requesting device.

9. The system of claim 8, wherein the reference is an input to the interface to retrieve online data and the second reference is an input to the second interface to retrieve offline data.

10. A method, comprising:
receiving, by a processor of a connector system, from a user interface input derived from injection code implemented on an interface of a message investigator system, a request to access an offline message datastore, the request originating from a requesting device in communication with the message investigator system;

responsive to the request, generating, by the processor, a second interface of the connector system, the second interface comprising a second plurality of user interface inputs specific to the offline message datastore, the second plurality of user interface inputs comprising a data element type input and a query parameter input;

receiving, by the processor, a specific type of data element to search via the data element type input and a search parameter via the query parameter input;

identifying, by the processor, element-dependent code based on the specific type of data element;

executing, by the processor, the identified element-dependent code with the search parameter to retrieve data that satisfies the search parameter; and transmitting, by the processor, the retrieved data to the requesting device.

11. The method of claim 10, wherein the data element type input comprises at least a first data element type input and a second data element type input that are mutually exclusive to one another.

12. The method of claim 11, wherein the first data element type input, when selected, causes first element-dependent code to be executed.

13. The method of claim 12, wherein the second data element type input, when selected, causes second element-dependent code, different than the first element-dependent code, to be executed.

14. The method of claim 10, wherein the interface is associated with retrieval operations for an online message datastore and the second interface is associated with retrieval operations for the offline message datastore.

15. The method of claim 14, wherein a state is maintained between the interface and the second interface.

16. The method of claim 10, further comprising:

generating, by a reporting system, a report comprising a reference to data in an online message datastore and a second reference to data in the offline message datastore; and transmitting, by the reporting system, the report to the requesting device.

17. The method of claim 16, wherein the reference is an input to the interface to retrieve online data.

18. The method of claim 16, wherein the second reference is an input to the second interface to retrieve offline data.

19. A non-transitory computer readable medium storing instructions that, when executed by a processor, program the processor to:

receive, from a user interface input derived from injection code implemented on an interface of a message investigator system, a request to access an offline message datastore, the request originating from a requesting device in communication with the message investigator system;

responsive to the request, generate a second interface of a connector system, the second interface comprising a one or more user interface inputs specific to the offline message datastore;

receive, via the one or more user interface inputs, one or more search parameters;

identify a specific type of data element to search based on the one or more search parameters;

identify element-dependent code based on the specific type of data element;

execute the identified element-dependent code based on the one or more search parameters to retrieve data that satisfies the search parameter; and transmit the retrieved data to the requesting device.

20. The non-transitory computer readable medium of claim 19, wherein the one or more search parameters comprise a record identifier having a string and wherein at least a portion of the string encodes the specific type of data element to search.

* * * * *